United States Patent
Si et al.

(10) Patent No.: US 11,165,562 B2
(45) Date of Patent: Nov. 2, 2021

(54) SEQUENTIAL ENCRYPTION METHOD BASED ON MULTI-KEY STREAM CIPHERS

(71) Applicant: Zhuhai College of Jilin University, Zhuhai (CN)

(72) Inventors: Yujuan Si, Zhuhai (CN); Liuqi Lang, Zhuhai (CN); Guanghui Feng, Zhuhai (CN); Jialiang Chen, Zhuhai (CN)

(73) Assignee: Zhuhai College of Jilin University, Zhuhai (CN)

( * ) Notice: Subject to any disclaimer, the term of this patent is extended or adjusted under 35 U.S.C. 154(b) by 326 days.

(21) Appl. No.: 16/328,691

(22) PCT Filed: Apr. 13, 2018

(86) PCT No.: PCT/CN2018/083019
§ 371 (c)(1),
(2) Date: Feb. 26, 2019

(87) PCT Pub. No.: WO2018/196634
PCT Pub. Date: Nov. 1, 2018

(65) Prior Publication Data
US 2019/0207745 A1    Jul. 4, 2019

(30) Foreign Application Priority Data
Apr. 26, 2017 (CN) .......................... 201710283461.8

(51) Int. Cl.
*H04L 9/06* (2006.01)
*H04L 9/08* (2006.01)
(Continued)

(52) U.S. Cl.
CPC ............. *H04L 9/065* (2013.01); *H04L 9/001* (2013.01); *H04L 9/0894* (2013.01); *H04L 9/14* (2013.01); *H04L 63/0457* (2013.01)

(58) Field of Classification Search
CPC ......... H04L 9/065; H04L 9/0894; H04L 9/14; H04L 9/001; H04L 63/0457; H04L 9/06; H04L 9/0618; G06F 2221/2109
See application file for complete search history.

(56) References Cited

U.S. PATENT DOCUMENTS 7,751,565 B2 * 7/2010 Yuen .......................... H04L 9/12
380/255
2002/0006197 A1 * 1/2002 Carroll .................. H04L 9/0662
380/44

(Continued)

*Primary Examiner* — Vu V Tran
(74) *Attorney, Agent, or Firm* — Inskeep IP Group, Inc.

(57) ABSTRACT

The invention discloses a sequential encryption method based on multi-key stream ciphers, comprising the following steps of: acquiring plaintext data, and storing the acquired plaintext data in the form of a circular linked list; storing a plurality of key sequences in the form of a circular linked list, respectively; performing a bitwise operation on the key sequences according to a specified starting bit to generate a stream random sequence; and, reconstructing the plaintext data according to the stream random sequence to generate encrypted ciphertext data. The method of the invention is simple in encryption and decryption, difficult to decipher, easy to implement by a computer without auxiliary hardware devices, fast in encryption and decryption speed, strong in the diffusion property of the generated ciphertext, and good in anti-interception performance and the like.

5 Claims, 1 Drawing Sheet

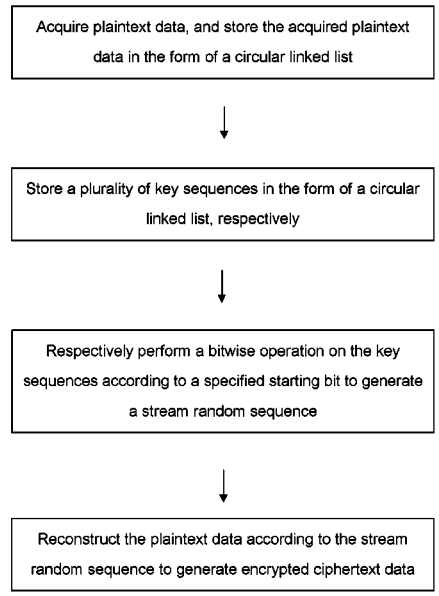

(51) Int. Cl.
*H04L 29/06* (2006.01)
*H04L 9/00* (2006.01)
*H04L 9/14* (2006.01)

(56) References Cited

U.S. PATENT DOCUMENTS

| | | | | |
|---|---|---|---|---|
| 2002/0044651 | A1* | 4/2002 | Tuvell | H04L 9/065 380/37 |
| 2006/0155994 | A1* | 7/2006 | Sun | H04L 12/1403 713/169 |
| 2006/0291650 | A1* | 12/2006 | Ananth | H04L 9/065 380/46 |
| 2009/0103726 | A1* | 4/2009 | Ahmed | H04L 9/0668 380/46 |
| 2020/0195430 | A1* | 6/2020 | Xu | H04L 9/16 |

* cited by examiner

```
┌─────────────────────────────────────────────────┐
│ Acquire plaintext data, and store the acquired  │
│ plaintext data in the form of a circular linked │
│ list                                            │
└─────────────────────────────────────────────────┘
                         │
                         ▼
┌─────────────────────────────────────────────────┐
│ Store a plurality of key sequences in the form  │
│ of a circular linked list, respectively         │
└─────────────────────────────────────────────────┘
                         │
                         ▼
┌─────────────────────────────────────────────────┐
│ Respectively perform a bitwise operation on the │
│ key sequences according to a specified starting │
│ bit to generate a stream random sequence        │
└─────────────────────────────────────────────────┘
                         │
                         ▼
┌─────────────────────────────────────────────────┐
│ Reconstruct the plaintext data according to the │
│ stream random sequence to generate encrypted    │
│ ciphertext data                                 │
└─────────────────────────────────────────────────┘
```

SEQUENTIAL ENCRYPTION METHOD BASED ON MULTI-KEY STREAM CIPHERS

RELATED APPLICATIONS

This application is the U.S. National Phase of and claims priority to International Patent Application No. PCT/CN2018/083019, International Filing Date Apr. 13, 2018, entitled Sequential Encryption Method Based On Multi-Key Stream Ciphers; which claims benefit of Chinese Patent Application No. 201710283461.8 filed Apr. 26, 2017; both of which are incorporated herein by reference in their entireties.

TECHNICAL FIELD

The invention relates to the technical field of data security, and in particular to, a sequential encryption method based on multi-key stream ciphers.

BACKGROUND OF THE INVENTION

With the continuous development of information technology represented by computer technology and network communication technology, the demand for encryption technology in the technical field of data security is also growing.

Stream ciphers are also referred to as sequence ciphers. In the existing research state of stream ciphers, the analysis and design of stream ciphers are often used for military and diplomatic communications in a country. Therefore, the development and design of stream ciphers are basically performed confidentially, and scholars and experts who research stream ciphers in each country have almost no published treatises on this aspect. In each country, the stream cipher technology and products are restrained on export as military products. Due to their many advantages over other ciphers, the stream ciphers have become one of the most common cryptographic systems today.

The current research directions of the stream cryptography are based on mathematical models, and use complex algebraic operations, Boolean algebraic operations, pseudo-random numbers, shift registers, linear feedback and the like to complete the encryption and decryption of stream ciphers. Some successful methods in this respect include A5 method, S-box method, RC4 method, K2 method and the like. These methods are already open secret. After years of research, some mature means for encryption and decryption have been established. At present, many scholars have studied attacking and deciphering the ciphertext encrypted by the above methods. Consequently, the security of the ciphertext encrypted by the above methods faces a great challenge.

At present, the stream ciphers are mainly designed by methods based on the system theory, and the key stream sequences is mainly generated by using a linear feedback shift register to generate pseudorandom sequences. A method for generating pseudorandom sequences is as follows: generating a sequence of a feedback shift register; generating a feedforward sequence by a linear shift register and a non-linear feedforward function; generating a clock-controlled sequence; combining network sequences; carrying the shift resister; using cellular automaton; using chaos theory; and the like. Due to its excellent performances such as the sensitivity to initial conditions, high structural complexity, long-term unpredictability and fast decay of auto-correlation, the chaotic system is naturally suitable for the basic requirements on the secure communication and cryptography.

REFERENCES

1. HE Ke-jing, Analysis of RC4 Stream Cipher and Microsoft Office Document Security, COMPUTER ENGINEERING, 2009.12 35 (23) p 130-p 135
2. CHEN Jie, Research on Algebraic Attack in Stream Cipher, XIDIAN UNIVERSITY MASTER'S THESES, 2005.01
3. WANG Huafeng ZHANG Guixiang SHAO Yong, Design of Chaotic Stream Cipher Based on Logistic Mapping, COMPUTER ENGINEERING, 2007, 33(10) p 164-p 168
4. LUO Song-jiang ZHU Lu-ping, Stream Cipher Encryption Scheme Based On Piecewise Nonlinear Chaotic Map, JOURNAL OF COMPUTER APPLICATIONS, 2010, 30(11) p 3038-p 3043
5. LUO Wei-hua, Research on Stream Cipher based Algebraic Attack and Algebraic immunity, NATIONAL UNIVERSITY OF DEFENSE TECHNOLOGY MASTER'S THESES, 2006.11
6. Zhou Jian-tao, Synchronization-Based Spatiotemporal Deterministic Random Stream Cipher and Key Exchange Protocol, SOUTHEAST UNIVERSITY MASTER'S THESES, 2005.3
7. ZHAO Li-jie, Research And Design of LFSR Based Stream Cipher, SOUTHWEST JIAOTONG UNIVERSITY MASTER'S THESES, 2006.4
8. LI Ai, Research On Character-Based Stream CipherAlgorithm Dragon, XIDIAN UNIVERSITY MASTER'S THESES, 2008.1
9. LI Shun-bo, HU Yu-pu, WANG Yan, Distinguishing Attack on The Stream Cipher Sosemanuk, JOURNAL OF HARBIN ENGINEERING UNIVERSITY 2012.2 33 (2) p 259-p 262
10. LIU Qiong, Research on The Fast Correlation Attack on Stream Cipher, XIDIAN UNIVERSITY MASTER'S THESES, 2010.1
11. WANG Jian-ming, Design and Analysis of Stream Cipher, BEIJING UNIVERSITY OF TECHNOLOGY MASTER'S THESES, 2006.6
12. LUO Qi-bin, ZHANG Jian, Status Quo And Development Of Stream Cipher, INFORMATION AND ELECTRONIC ENGINEERING 2006.2 4(1) p 75-p 81
13. ZHU Yan-li, Research On the Complexity Of Stream Cipher, YANGZHOU UNIVERSITY MASTER'S THESES 2008.5
14. WEI Shi-ming, analysis of stream cipher and its complexity, XIDAN UNIVERSITY DOCTORAL THESES, 2001.1
15. HU Neng-fa, Stream Cipher Key Sequence Classification Evolutionary Generation, HUAZHONG UNIVERSITY OF SCIENCE AND TECHNOLOGY MASTER'S THESES, 2005.4
16. HUANG Rong, research and implementation of stream cipher for image-text chaotic encryption transmission, South China University of Technology MASTER'S THESES, 2005.5
17. DONG Bin-hui, ZHOU Jian-yong, Design And Implementation Of Chaos Based Stream Cipher, COMPUTER AND APPLICATION 2009, 45 (35) p 120-p 150
18. CAI Ying, ZHANG Jia-shu, design of high dimension chaotic stream cipher based on parameter shifting, Journal of the China Railway Society 2003.12 25 (6) p 61-p 65
19. WU Li-hua, Research on Distinguishing Attack on a New Stream Cipher Structure, XIDIAN UNIVERSITY MASTER'S THESES 2008

20. LI Shun-bo, HU Yu-pu, WANG Yan, Distinguishing Attack on Stream Cipher HC-256', JOURNAL OF ELECTRONICS AND INFORMATION TECHNOLOGY 2012.4 34 (4) p 807-p 811
21. LIU Shu-kai, GUANG Jie, CHANG Ya-qin, Guess And Determine Attack On Stream Cipher K2 Algorithm, COMPUTER ENGINEERING 2011.4 37 (7) p 168-p 811
22. CHANG Ya-qin, JIN Chen-hui, known plaintext attack on stream cipher MAG algorithm, COMPUTER ENGINEERING 2010.10 36 (20) p 159-p 172

SUMMARY OF THE INVENTION

In the invention a dynamically parasitic method of a chaotic stream is adopted, which is different from the previous chaotic streams in generation that the chaotic stream proposed in the patent can be in any file mode and is not a chaotic stream generated from a function or signal generator, namely this chaotic stream can be referred to as a true random sequence rather than a pseudorandom sequence. Even if this method is guessed, since the chaotic stream is an unordered sequence, it is almost impossible to be deciphered. If an exhaustion method is used, it is almost impossible to implement mathematically, and it is also almost impossible to implement by a computer. The number of exhaustion times is the second power of 8 times of the number of bytes (N) of the plaintext, i.e., $2^{8n}$.

The invention employs the following technical solutions. A sequential encryption method based on multi-key stream ciphers is provided, including the following steps of: acquiring plaintext data, and storing the acquired plaintext data in the form of a circular linked list; storing a plurality of key sequences in the form of a circular linked list, respectively; performing a bitwise operation on the key sequences according to a specified starting bit to generate a stream random sequence; and, reconstructing the plaintext data according to the stream random sequence to generate encrypted ciphertext data.

Preferably, the step of acquiring plaintext data and storing the acquired plaintext data in the form of a circular linked list further includes the following sub-steps of: S11: reading the number of bytes of the plaintext data, and establishing a continuous storage space in a memory according to the number of bytes; and, S12: sequentially storing the plaintext data in the storage space, and establishing, at a trail byte in the storage space, a pointer pointing to the address of the first byte of the plaintext data stored in the storage space so as to establish an unidirectional circular linked list.

Preferably, the step of storing a plurality of key sequences in the form of a circular linked list respectively further includes the following sub-steps of: S21: reading the number of bytes of each of the key sequences, and establishing, in the memory, a continuous storage space corresponding to each of the key sequences according to the read number of bytes; and, S22: storing each of the key sequence in the respective storage space, and establishing, at a trail byte in the respective storage space, a pointer pointing to the address of the first byte of the key sequence stored in this storage space so as to establish an unidirectional circular linked list.

Preferably, in the step of performing a bitwise operation on the key sequences according to a specified starting bit to generate a stream random sequence, the bitwise operation is a cyclic bitwise XOR operation.

Preferably, the step of reconstructing the plaintext data according to the stream random sequence to generate encrypted ciphertext data further includes the following sub-steps of: S41: reading the stream random sequence bit by bit in the form of a binary character string; S42: reconstructing, according to the value of each bit of the stream random sequence read bit by bit, the position of each bit value of the plaintext data from a specified starting bit; and, S43: storing or outputting the reconstructed plaintext data as encrypted ciphertext data.

Preferably, the plurality of key sequences are not equal in length.

Preferably, the number of the plurality of key sequences is 2.

The invention has the following beneficial effects: the length of the ciphertext data C obtained by the above encryption method is the same as that of the plaintext data M, so no redundancy is generated, and it is convenient to predict and control the size of the ciphertext data; the statistical characteristics of the plaintext data M may be completely eliminated, and it is difficult to decrypt; the encryption and description method is simple and is extremely difficult to decipher; since the encryption is performed bit by bit, it is easy to implement by a computer without auxiliary hardware devices, and the encryption speed is fast; the plaintext data is reconstructed bit by bit according to the chaotic stream sequences, so the generated ciphertext has strong diffusion property and good anti-interception performance; a complicated stream random sequence is obtained by a cyclic bitwise operation on a plurality of keys, so the complexity and length of the keys are reduced; the keys are stored in the form of a circular linked list, different bits are selected as starting bits during encryption, and a long stream random sequence may be realized by short keys, so the generated stream random sequence are high in randomness, so that it is ensured that the stream random sequence generated during each encryption are not repeated, and the principle of one cipher corresponding to one key is followed; and, during the encryption by multi-keys, only some leys may be replaced, it is convenient to replace keys, and the keys may be stored by different persons, so that it is ensured that the plaintext is more secure.

BRIEF DESCRIPTION OF THE DRAWINGS

FIG. 1 shows a flowchart of an encryption process according to an embodiment of the invention.

DETAILED DESCRIPTION OF THE INVENTION

The concepts, specific structures and technical effects of the invention will be described in detail below by embodiments with reference to the accompanying drawings in order to help readers fully understand the objectives, solutions and technical effects of the invention. It is to be noted that, the embodiments in the application and the features in the embodiments can be combined without conflict.

Referring to FIG. 1, in an embodiment of the invention a sequential encryption method based on multi-key stream ciphers is provided, including the following steps.

Plaintext data is acquired, and the acquired plaintext data is stored in the form of a circular linked list, wherein the plaintext data may be a piece of complete data, or a data segment having a fixed length or a variable length that is truncated from stream data. Herein, the circular linked list can be any type of linked storage structures which broadly meets the conditions that the first and last nodes are connected and data corresponding to all valid nodes can be traversed from any one node, and does not just refer to a physically continuous storage space.

Specifically, according to the method proposed, the number of bytes of the plaintext data is read, and a continuous storage space in a memory is established according to the number of bytes. The size of the storage space is no less than the size of the plaintext data. Here, the continuation may be continuation either in physical address or in mapping, that is, according to one storage address at least one other storage address can be acquired in the storage space, the whole storage space can thus be traversed from one storage address. For this, a unidirectional linked list is an example. Subsequently, the plaintext data is sequentially stored in the storage space in the form of binary or single-byte characters or the like, and a pointer pointing to the address of the first byte of the plaintext data stored in this storage space is established at a trail byte in this storage space, so as to establish an unidirectional circular linked list. A plurality of key sequences are stored in the form of a circular linked list; a cyclic bitwise operation is respectively performed on each of the key sequences according to a specified starting bit to generate a stream random sequence; and, the plaintext data is reconstructed according to the stream random sequence to generate encrypted ciphertext data. Specific embodiments will be used to describe the encryption and decryption processes according to the invention, as follows.

Encryption Process:

In a preferred embodiment, the description will be given by taking two keys as example. However, it should be understood that more than two keys may be used by those skilled in the art with reference to the contents disclosed herein. M, P0, P1 and A represent a set of plaintext data, a set of first keys, a set of second keys and a set of ciphertext data, respectively. The value of the plaintext data, the value of the first key and the value of the second key refer to Table 1.

TABLE 1

| | \multicolumn{16}{c}{M = {"啡啡", (0xD6D0 0xB9FA)}} |
|---|---|---|---|---|---|---|---|---|---|---|---|---|---|---|---|---|
| | \multicolumn{4}{c}{D} | \multicolumn{4}{c}{6} | \multicolumn{4}{c}{D} | \multicolumn{4}{c}{0} |
| | x0 | x1 | x2 | x3 | x4 | x5 | x6 | x7 | x8 | x9 | x10 | x11 | x12 | x13 | x14 | x15 |
| p | 1 | 1 | 0 | 1 | 0 | 1 | 1 | 0 | 1 | 1 | 0 | 1 | 0 | 0 | 0 | 0 |
| | \multicolumn{16}{c}{P0 = {"玫瑰", (0xC3B5 0xB9E5)}} |
| | \multicolumn{4}{c}{C} | \multicolumn{4}{c}{3} | \multicolumn{4}{c}{B} | \multicolumn{4}{c}{5} |
| | y00 | y01 | y02 | y03 | y04 | y05 | y06 | y07 | y08 | y09 | y010 | y011 | y012 | y013 | y014 | y015 |
| q | 1 | 1 | 0 | 0 | 0 | 0 | 1 | 1 | 1 | 0 | 1 | 1 | 0 | 1 | 0 | 1 |
| | \multicolumn{16}{c}{P1 = {"牡丹", (0x0C4B5 0xB5A4)}} |
| | \multicolumn{4}{c}{C} | \multicolumn{4}{c}{4} | \multicolumn{4}{c}{B} | \multicolumn{4}{c}{5} |
| | y10 | y11 | y12 | y13 | y14 | y15 | y16 | y17 | y18 | y19 | y110 | y111 | y112 | y113 | y114 | y115 |
| r | 1 | 1 | 0 | 0 | 0 | 1 | 0 | 0 | 1 | 0 | 1 | 1 | 0 | 1 | 0 | 1 |
| | \multicolumn{16}{c}{Truth Table} |
| | y04 | y05 | y06 | y07 | y08 | y09 | y010 | y011 | y012 | y013 | y014 | y015 | y016 | y017 | y018 | y019 |
| | 0 | 0 | 1 | 1 | 1 | 0 | 1 | 1 | 0 | 1 | 0 | 1 | 1 | 0 | 1 | 1 |
| | y16 | y17 | y18 | y19 | y110 | y111 | y112 | y113 | y114 | y115 | y116 | y117 | y118 | y119 | y120 | y121 |
| r^q | 0 | 0 | 1 | 0 | 1 | 1 | 0 | 1 | 0 | 1 | 1 | 0 | 1 | 1 | 0 | 1 |
| | 0 | 0 | 0 | 1 | 0 | 1 | 1 | 0 | 0 | 0 | 1 | 1 | 0 | 1 | 1 | 0 |
| | \multicolumn{16}{c}{C = {"赛", (0xEB9F 0xA686)}} |
| | \multicolumn{4}{c}{E} | \multicolumn{4}{c}{B} | \multicolumn{4}{c}{9} | \multicolumn{4}{c}{F} |
| | z0 | z1 | z2 | z3 | z4 | z5 | z6 | z7 | z8 | z9 | z10 | z11 | z12 | z13 | z14 | z15 |
| s | 1 | 1 | 1 | 0 | 1 | 0 | 1 | 1 | 1 | 0 | 0 | 1 | 1 | 1 | 1 | 1 |
| | \multicolumn{16}{c}{M = {"中国", (0xD6D0 0xB9FA)}} |
| | \multicolumn{4}{c}{B} | \multicolumn{4}{c}{9} | \multicolumn{4}{c}{F} | \multicolumn{4}{c}{A} |
| | x16 | x17 | x18 | x19 | x20 | x21 | x22 | x23 | x24 | x25 | x26 | x27 | x28 | x29 | x30 | x31 |
| p | 1 | 0 | 1 | 1 | 1 | 0 | 0 | 1 | 1 | 1 | 1 | 1 | 1 | 0 | 1 | 0 |

TABLE 1-continued

| P0 = {"玫瑰", (0xC3B5 0xB9E5)} | | | | | | | | | | | | | | | |
|---|---|---|---|---|---|---|---|---|---|---|---|---|---|---|---|
| | B | | | | 9 | | | | E | | | | 5 | | |
| | y016 | y017 | y018 | y019 | y020 | y021 | y022 | y023 | y024 | y025 | y026 | y027 | y028 | y029 | y030 | y031 |
| q | 1 | 0 | 1 | 1 | 1 | 0 | 0 | 1 | 1 | 1 | 1 | 0 | 0 | 1 | 0 | 1 |
| P1 = {"牡丹", (0x0C4B5 0xB5A4)} | | | | | | | | | | | | | | | |
| | B | | | | 5 | | | | A | | | | 4 | | |
| | y116 | y117 | y118 | y119 | y120 | y121 | y122 | y123 | y124 | y125 | y126 | y127 | y128 | y129 | y130 | y131 |
| r | 1 | 0 | 1 | 1 | 0 | 1 | 0 | 1 | 1 | 0 | 1 | 0 | 0 | 1 | 0 | 0 |
| Truth Table | | | | | | | | | | | | | | | |
| | y020 | y021 | y022 | y023 | y024 | y025 | y026 | y027 | y028 | y029 | y030 | y031 | y00 | y01 | y02 | y03 |
| | 1 | 0 | 0 | 1 | 1 | 1 | 1 | 0 | 0 | 1 | 0 | 1 | 1 | 1 | 0 | 0 |
| | y122 | y123 | y124 | y125 | y126 | y127 | y128 | y129 | y130 | y131 | y10 | y11 | y12 | y13 | y14 | y15 |
| r^q | 0 | 1 | 1 | 0 | 1 | 0 | 0 | 1 | 0 | 0 | 1 | 1 | 0 | 0 | 0 | 1 |
|  | 1 | 1 | 1 | 1 | 0 | 1 | 1 | 1 | 0 | 1 | 1 | 0 | 1 | 1 | 0 | 1 |
| C = {"张", (0xEB9F 0xA686)} | | | | | | | | | | | | | | | |
| | A | | | | 6 | | | | 8 | | | | 6 | | |
| | z16 | z17 | z18 | z19 | z20 | z21 | z22 | z23 | z24 | z25 | z26 | z27 | z28 | z29 | z30 | z31 |
| s | 1 | 0 | 1 | 0 | 0 | 1 | 1 | 0 | 1 | 0 | 0 | 0 | 0 | 1 | 1 | 0 |

Wherein, M={"中国"} represents the plaintext data, i.e., text to be encrypted, and (0xD6D0 0xB9FA) represents machine codes of the two characters "中国", i.e., an input sequence to be encrypted. P0={"玫瑰"} represents the first key, and (0xC3B5 0xB9E5) represents machine codes of the two characters "玫瑰". P1={"牡丹"} represents the second key, and (C4B5 B5A4) represents machine codes of the two characters "牡丹". C={"张"} represents the encrypted ciphertext data, and (0xEB9F 0xA686) represents machine codes of the ciphertext C.

The plaintext file M is read and the number n of bytes of the plaintext file M is counted, where each byte is 8 bits. In a memory (e.g., a memory of a computer), storage spaces are allocated for the plaintext data, the first key, the second key and the ciphertext data. For example, pseudo-codes in language C are as follows:

p_str_M=(char*)malloc(n*sizeof(char));
p_str_P0=(char*)malloc(n*sizeof(char));
p_str_P1=(char*)malloc(n*sizeof(char));
p_str_C=(char*)malloc(n*sizeof(char)).

The first key P0 and the second key P1 may be different or the same in length. When the first key P0 and the second key P1 are different in length, the stream random sequence generated after the cyclic bitwise operation may be far longer than the first key P0 and the second key P1. For convenience of calculation, the first key P0 and the second key P1 of the same length are used. For the first key P0, a new sequence is established by using an initial value "4" as a starting bit of P0 according to the circular linked list; and, for the second key P1, a new sequence is established by using an initial value "6" as a starting bit of P1 according to the circuit linked list. *r and *q represent pointers pointing to the currently selected bytes of the first key and the second key, which are selected from the starting bits of the first key and the second key. A XOR calculation is performed on the selected bytes, that is, *r&&*q is calculated. The result of the calculation is used as an encrypted stream random sequence (referring to "truth table" in Table 1).

The numerical value of each bit of the plaintext data is reconstructed in position according to the value of each bit of the obtained stream random sequence (the numerical value of each bit is generally {0,1}; in addition, it is not necessary to shift the numerical value of each bit).

For example, in unit of each bit, the plaintext is encrypted in two cycles.

Specifically, during a first cycle, addresses of numerical values of some bits of the plaintext data are reconstructed according to the bits having a stream random sequence of 1.

For example, a pointer p_str_M points to a byte to which a bit x5 belongs; a pointer p_str_P0 points to a byte to which a bit y04 belongs; a pointer p_str_P1 points to a byte to which a bit y16 belongs; and, a pointer p_str_C points to a byte to which a bit z2 belongs. When an end marker is encountered, it points to the first byte. The pseudo-codes foe reference in this process are as follows:

```
for(i=0; i<8*n; i++)
    {x = string_read_bit (p_str_P0, i);
     y = string_read_bit (p_str_P1, i) ;
if (xor (x, y))
    {z = string_read_bit (p_str_M, i) ;
     string_write_bit (p_str_C, i, z) ;
     p_str_P0++; p_str_P1++; p_str_M++;p_str_C++}
else
    {p_str_P0++; p_str_P1++; p_str_M++;}
}
```

During a second cycle, addresses of numeral values of the remaining bits of the plaintext data are reconstructed according to the bits having a stream random sequence of 0. The pseudo-codes for reference in this process are as follows:

```
for(i=0; i<8*n; i++)
    {x = string_read_bit (p_str_P0, i) ;
     y = string_read_bit (p_str_P1, i) ;
    if (!xor (x, y))
        {z = string_read_bit (p_str_M, i) ;
        string_write_bit (p_str_C, i, z) ;
        p_str_P0++; p_str_P1++; p_str_M++; p_str_C++;}
    else
        {p_str_P0++; p_str_P1++; p_str_M++;}
}
```

Finally, p_str_C points to the first address of the allocated ciphertext storage space, and n bytes in this space are written into the ciphertext file C. Thus, the ciphertext data C= {"䥧"}={0xE967 0x633D}=(1101 1000 0101 0110 0100 1101 1011 1110) is obtained. Finally, the ciphertext data C is stored in a specified storage medium such as a memory or a hard disk, or outputted to an external output device such as a display or a printer. The above processes and the correspondence may refer to Table 1. Both the plaintext data M and the ciphertext data C are read and written rightwards from initial values. While the last bit on the right is read or written, it continues to read or write from the left. It should be understood by those skilled in the art that the data is stored by linked lists that are physically discontinuously stored. It is also possible to read and write the plaintext data M or the ciphertext data C in any order.

Since the length of the ciphertext data C obtained according to the encryption method is the same as that of the plaintext data M, no redundancy is generated, and thus it is easy to predict and control the size of the ciphertext data. The statistical characteristics of the plaintext data M may be completely eliminated, and thus it is difficult to decrypt. The plaintext data is reconstructed bit by bit according to the chaotic stream sequences, so the generated ciphertext has strong diffusion property and good anti-interception performance. A complicated stream random sequence may be generated by a plurality of simple key sequences. Each key sequence may be a doubly circular linked list or even a multi-circular linked list, and the direction and starting bit of the linked list may be used as a part of a function or key of a variable such as time, so that the complexity of encryption is further increased. The operations based on the linked list and bitwise operation are adapted to the physical structure of the computer, and the calculation efficiency is high. Preferably, the plaintext data may be segmented, and each segment is encrypted by a starting bit of a different corresponding key sequence according to the segment number of each segment, so that the stream random sequence used for encrypting each segment of the plaintext data is also different. For example, the starting bit of the first key sequence P0 corresponding to the first segment of the plaintext data is 1 (segment number)+3 (offset value)=5 (starting bit), and the starting bit of the corresponding second key sequence P1 is 1 (segment number)−3 (offset value)+32 (the total number of bits of the second key sequence)=30. Accordingly, the complexity of decryption is further increased. In addition, it is also possible that the starting bit selected during each encryption for each key sequence is stored as an independent key sequence (e.g., a third key sequence {5, 30, . . . }).

Decryption Process:

The decryption process is an inverse operation of the encryption process. In this embodiment, the ciphertext data processed by the above encryption process is decrypted.

M, P0, P1 and A represent plaintext data, a first key, a second key and ciphertext data, respectively. The value of the plaintext data, the value of the first key and the value of the second key refer to Table 2.

TABLE 2

| | C = {"㷿", (0xEB9F 0xA686)} | | | | | | | | | | | | | | | |
|---|---|---|---|---|---|---|---|---|---|---|---|---|---|---|---|---|
| | E | | | | B | | | | 9 | | | | F | | | |
| | x0 | x1 | x2 | x3 | x4 | x5 | x6 | x7 | x8 | x9 | x10 | x11 | x12 | x13 | x14 | x15 |
| s | 1 | 1 | 1 | 0 | 1 | 0 | 1 | 1 | 1 | 0 | 0 | 1 | 1 | 1 | 1 | 1 |
| | P0 = {"政䈎", (0xC3B5 0xB9E5)} | | | | | | | | | | | | | | | |
| | C | | | | 3 | | | | B | | | | 5 | | | |
| | y00 | y01 | y02 | y03 | y04 | y05 | y06 | y07 | y08 | y09 | y010 | y011 | y012 | y013 | y014 | y015 |
| q | 1 | 1 | 0 | 0 | 0 | 0 | 1 | 1 | 1 | 0 | 1 | 1 | 0 | 1 | 0 | 1 |
| | P1 = {"䋌", (0xC4B5 0xB5A4)} | | | | | | | | | | | | | | | |
| | C | | | | 4 | | | | B | | | | 5 | | | |
| | y10 | y11 | y12 | y13 | y14 | y15 | y16 | y17 | y18 | y19 | y110 | y111 | y112 | y113 | y114 | y115 |
| r | 1 | 1 | 0 | 0 | 0 | 1 | 0 | 0 | 1 | 0 | 1 | 1 | 0 | 1 | 0 | 1 |
| | Truth Table | | | | | | | | | | | | | | | |
| | y04 | y05 | y06 | y07 | y08 | y09 | y010 | y011 | y012 | y013 | y014 | y015 | y016 | y017 | y018 | y019 |
| | 0 | 0 | 1 | 1 | 1 | 0 | 1 | 1 | 0 | 1 | 0 | 1 | 1 | 0 | 1 | 1 |
| | y16 | y17 | y18 | y19 | y110 | y111 | y112 | y113 | y114 | y115 | y116 | y117 | y118 | y119 | y120 | y121 |
| r^q | 0 | 0 | 1 | 0 | 1 | 1 | 0 | 1 | 0 | 1 | 0 | 1 | 1 | 0 | 1 |
| | 0 | 0 | 0 | 1 | 0 | 1 | 1 | 0 | 0 | 1 | 1 | 0 | 1 | 1 | 0 |

TABLE 2-continued

M = {"中国", (0xD6D0 0xB9FA)}

| | D | | | | 6 | | | | D | | | | 0 | | |
|---|---|---|---|---|---|---|---|---|---|---|---|---|---|---|---|
| x0 | x1 | x2 | x3 | x4 | x5 | x6 | x7 | x8 | x9 | x10 | x11 | x12 | x13 | x14 | x15 |
| p | 1 | 1 | 0 | 1 | 0 | 1 | 1 | 0 | 1 | 1 | 0 | 1 | 0 | 0 | 0 | 0 |

C = {"震", (0xEB9F 0xA686)}

| | A | | | | 6 | | | | 8 | | | | 6 | | |
|---|---|---|---|---|---|---|---|---|---|---|---|---|---|---|---|
| x16 | x17 | x18 | x19 | x20 | x21 | x22 | x23 | x24 | x25 | x26 | x27 | x28 | x29 | x30 | x31 |
| s | 1 | 0 | 1 | 0 | 0 | 1 | 1 | 0 | 1 | 0 | 0 | 0 | 0 | 1 | 1 | 0 |

P0 = {"玫瑰", (0xC3B5 0xB9E5)}

| | B | | | | 9 | | | | E | | | | 5 | | |
|---|---|---|---|---|---|---|---|---|---|---|---|---|---|---|---|
| y016 | y017 | y018 | y019 | y020 | y021 | y022 | y023 | y024 | y025 | y026 | y027 | y028 | y029 | y030 | y031 |
| q | 1 | 0 | 1 | 1 | 1 | 0 | 0 | 1 | 1 | 1 | 1 | 0 | 0 | 1 | 0 | 1 |

P1 = {"牡丹", (0xC4B5 0xB5A4)}

| | B | | | | 5 | | | | A | | | | 4 | | |
|---|---|---|---|---|---|---|---|---|---|---|---|---|---|---|---|
| y116 | y117 | y118 | y119 | y120 | y121 | y122 | y123 | y124 | y125 | y126 | y127 | y128 | y129 | y130 | y131 |
| r | 1 | 0 | 1 | 1 | 0 | 1 | 0 | 1 | 1 | 0 | 1 | 0 | 0 | 1 | 0 | 0 |

Truth Table

| | y020 | y021 | y022 | y023 | y024 | y025 | y026 | y027 | y028 | y029 | y030 | y031 | y00 | y01 | y02 | y03 |
|---|---|---|---|---|---|---|---|---|---|---|---|---|---|---|---|---|
| | 1 | 0 | 0 | 1 | 1 | 1 | 1 | 0 | 0 | 1 | 0 | 1 | 1 | 1 | 0 | 0 |
| | y122 | y123 | y124 | y125 | y126 | y127 | y128 | y129 | y130 | y131 | y10 | y11 | y12 | y13 | y14 | y15 |
| r^q | 0 | 1 | 1 | 0 | 1 | 0 | 0 | 1 | 0 | 0 | 1 | 1 | 0 | 0 | 0 | 1 |
| | 1 | 1 | 1 | 1 | 0 | 1 | 1 | 0 | 0 | 1 | 1 | 0 | 1 | 1 | 0 | 1 |

M = {"中国", (0xD6D0 0xB9FA)}

| | B | | | | 9 | | | | F | | | | A | | |
|---|---|---|---|---|---|---|---|---|---|---|---|---|---|---|---|
| x16 | x17 | x18 | x19 | x20 | x21 | x22 | x23 | x24 | x25 | x26 | x27 | x28 | x29 | x30 | x31 |
| p | 1 | 0 | 1 | 1 | 1 | 0 | 0 | 1 | 1 | 1 | 1 | 1 | 1 | 0 | 1 | 0 |

Wherein, C={"震"} represents the encrypted ciphertext data, and (0xEB9F 0xA686) represents machine codes of the ciphertext C, i.e., an input sequence to be encrypted. P0={"玫瑰"} represents the first key, and (0xC3B5 0xB9E5) represents machine codes of the two characters "玫瑰". P1={"牡丹"} represents the second key, and (C4B5 B5A4) represents machine codes of the two characters "牡丹". M={"中国"} represents the plaintext data, i.e., text to be encrypted, and (0xD6D0 0xB9FA) is machine codes of the two characters "中国".

The ciphertext file C is read and the number m of bytes of the ciphertext file C is counted, where each byte is 8 bits. In a memory (e.g., a memory of a computer), storage spaces are allocated for the ciphertext data, the first key, the first key and the plaintext data. The specific method is the same as that in the encryption process and will not be repeated here.

An initial value "4" is used as a starting bit of a circular linked list of the first key P0; and, for the second key P1, in accordance with a circular linked list, an initial value "6" is used as a starting bit of the circular linked list of the second key P1. *r and *q represent pointers pointing to the currently selected bytes of the first key and the second key. Bytes are selected from the starting bits of the first key and the second key, and XOR calculation is performed on the selected bytes, that is, *r&&*q is calculated. The result of the calculation is used as a decrypted stream random sequence (referring to "truth table" in Table 2).

Evaluation is performed bit by bit from the position of the ciphertext data z2, and the value (0 or 1) of each bot of the stream random sequence is backfilled in the storage space for the plaintext data M. The starting position of the backfilling is x5.

Specifically, the ciphertext data is decrypted in two cycles according to the value of each bit of the obtained stream random sequence.

During a first cycle, addresses of some bits of the ciphertext data are restored according to the bits having a stream random sequence of 1. The pseudo-codes for reference in this process are as follows:

```
for(i=0; i<8*m; i++)
    {x = string_read_bit(p_str_P0, i) ;
     y = string_read_bit(p_sir_P1, i) ;
```

```
if (xor (x, y) )
    {z = string_read_bit (p_sir_C, i) ;
    string_write_bit (p_sir_M, i, z) ;
    p_str_P0++; p_str_P1++; p_str_M++;p_str_C++;}
else
    {p_str_P0++; p_str_P1++; p_str_M++;}
}
```

During a second cycle, addresses of some bits of the ciphertext data are restored according to the bits having a stream random sequence of 0. The reference pseudo-codes in this process are as follows:

```
for(i=0; i<8*m; i++)
    {x = string_read_bit (p_str_P0, i) ;
    y = string_read_bit (p_str_P1, i) ;
if(!xor(x, y))
    {z = string_read_bit (p_str_C, i) ;
    string_write_bit (p_str_M, i, z) ;
    p_str_P0++; p_str_P1++; p_str_M++;p_str_C++;}
else
    {p_str_P0++; p_str_P1++; p_str_M++;}
}
```

Finally, p_str_M points to the first address of the allocated plaintext storage space, and n bytes in this space are written into the ciphertext file C. Thus, the plaintext data M= {" 中国 "}={0xD6 0xD0 0xB9 0xFA}=(1101 0110 1101 0000 1011 1000 1111 1010) is obtained. The above process and the correspondence may refer to Table 2. Both the plaintext data M and the ciphertext data C are read and written right from the initial value. While the last bit on the right is read or written, it continues to read or write from the left.

Description of Definitions

Sets M, C, P and A in a tetrad (M, C, P, A) of an encryption system have the following characteristics:

1. the information {0,1} in the set is a byte character set consisting of binary code elements. It is applied to ASCII codes.

2. The plaintext set M has n bytes, and the number of code elements is marked with sum(M)=8n, then sum(M)mod 8=0.

3. For the number of elements in the ciphertext set C, the M set is used as an initial value, and c1, c2, c3, . . . , cr are obtained by r iterations. For a subset cj (j=1, 2, 3, . . . , r), the number of code elements is marked with sum(cj), then sum(cj)mod 8=0. If the number of bytes of the subset cj is assumed as m, then:

when m<n, it is referred to as compressed encryption;
when m=n, it is referred to as one-to-one encryption or equidensity encryption; and
when m>n, it is referred to as redundancy encryption.

4. The number of code elements in the key set P is marked with sum(P), then sum(P) mod 8=0. If the number of bytes in the set P is assumed as m, then m≤n. The number of bytes in the set P is preliminarily defined as 1. The encryption and the decryption shares the key set P. There are no codes in this set.

5. The algorithms in the definitions have feasibility, definiteness, finiteness, input uniqueness and output uniqueness.

6. The algorithm set A is a set of computer-executable codes, also referred to as a set of functions. If the number of elements in the set A is marked with sum(A), then sum(A) mod 2=0.

The algorithm is characterized in that:
if there is an algorithm a for encrypting ci into cj, there must be an algorithm b for reducing cj to ci. That is, there is an inverse algorithm or a reduction algorithm.

In addition, the technical solutions involved in the invention also have the following advantages:

1. the method is simple and difficult to decipher;
2. it is easy to implement by computer algorithms and programming;
3. the plaintext encryption, transmission, reception and decryption are performed in accordance with a three-separation principle, so that the secrecy system is more secure;
4. the encryption method is unordered encryption, rather than conventional one-to-one or one-to-multiple encryption;
5. transmission may be performed in existing disclosed communication channels;
6. no auxiliary hardware device is required, and implementation is realized completely by software;
7. this technology follows the One-Time Pad (OTP) cryptosystem proposed by Shannon; and
8. the key bytes may be in any length, and the encryption complexity will increase with the increase of the length of key bytes.

The foregoing description merely shows the preferred embodiments of the invention, and the invention is not limited to the above implementations. All technical effects of the invention obtained by any identical means shall fall into the protection scope of the invention. Various different modifications and variations can be made to the technical solutions and/or implementations within the protection scope of the invention. Additionally, the terms used herein are merely for describing particular embodiments, rather than limiting the present disclosure. The singular form, such as "a/an", "said" and "the", used in the present disclosure and the appended claims is intended to include a plural form, unless otherwise clearly indicated in the context. It should be further understood that the term "and/or" used herein refers to and include any or all possible combinations of one or more associated listed items.

The invention claimed is:

1. A sequential encryption method based on multi-key stream ciphers, comprising the following steps of:
    acquiring plaintext data, and storing the acquired plaintext data in the form of a circular linked list;
    storing a plurality of key sequences in the form of a circular linked list, respectively;
    performing a bitwise operation on the plurality of key sequences according to a specified starting bit to generate a stream random sequence; wherein, the bitwise operation is a cyclic bitwise XOR operation; and
    reconstructing the plaintext data according to the stream random sequence to generate encrypted ciphertext data; wherein, the reconstructing the plaintext data further comprises the following sub-steps of:
    reading the stream random sequence bit by bit in the form of a binary character string;
    reconstructing, according to the value of each bit of the stream random sequence read bit by bit, the position of each bit value of the plaintext data from a specified starting bit; and
    storing or outputting the reconstructed plaintext data as encrypted ciphertext data.

2. The method according to claim 1, wherein the step of acquiring plaintext data and storing the acquired plaintext data in the form of a circular linked list further comprises the following sub-steps of:

reading the number of bytes of the plaintext data, and establishing a continuous storage space in a memory according to the number of bytes; and sequentially storing the plaintext data in the storage space, and establishing, at a trail byte in the storage space, a pointer pointing to the address of the first byte of the plaintext data stored in the storage space so as to establish a unidirectional circular linked list.

3. The method according to claim 1, wherein the step of storing a plurality of key sequences in the form of a circular linked list respectively further comprises the following sub-steps of:

reading the number of bytes of each of the key sequences, and establishing; in the memory, a continuous storage space corresponding to each of the key sequences according to the read number of bytes; and storing each of the key sequence in the respective storage space, and establishing, at a trail byte in the respective storage space, a pointer pointing to the address of the first byte of the key sequence stored in this storage space so as to establish a unidirectional circular linked list.

4. The method according to claim 1, wherein the plurality of key sequences are not equal in length.

5. The method according to claim 1, wherein the number of the plurality of key sequences is 2.

* * * * *